May 9, 1944. R. DALLY 2,348,526
CRYSTAL PICKUP UNIT
Filed April 10, 1941 3 Sheets-Sheet 1

Inventor:
Roy Dally
By
McCaleb, Wendt & Dickinson
Attys.

May 9, 1944.  R. DALLY  2,348,526
CRYSTAL PICKUP UNIT
Filed April 10, 1941  3 Sheets-Sheet 2
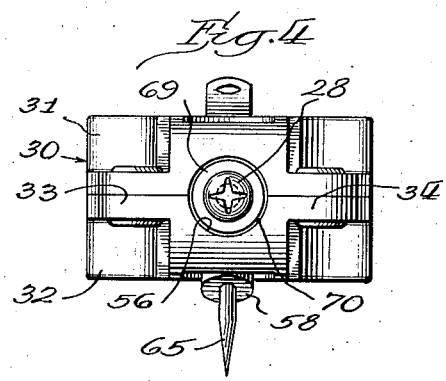
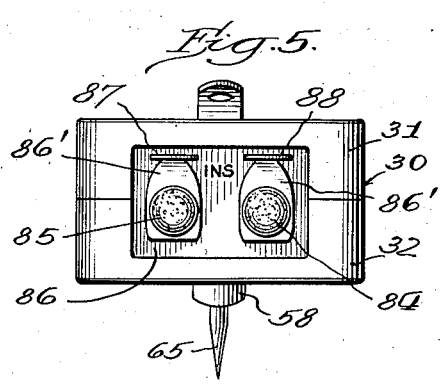
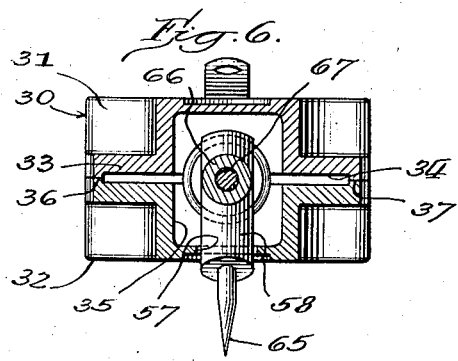
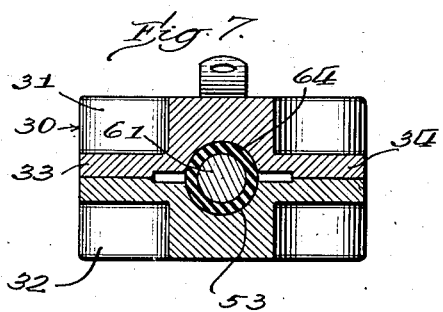
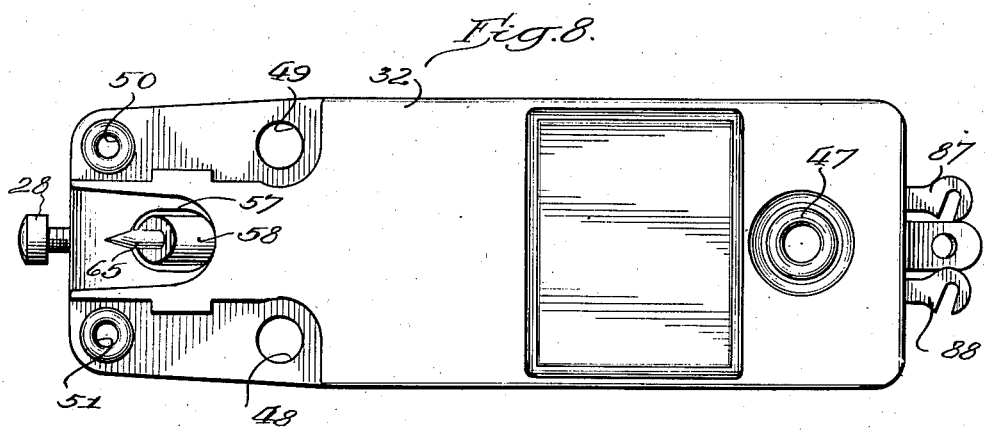
Inventor
Roy Dally May 9, 1944. R. DALLY 2,348,526
CRYSTAL PICKUP UNIT
Filed April 10, 1941 3 Sheets-Sheet 3
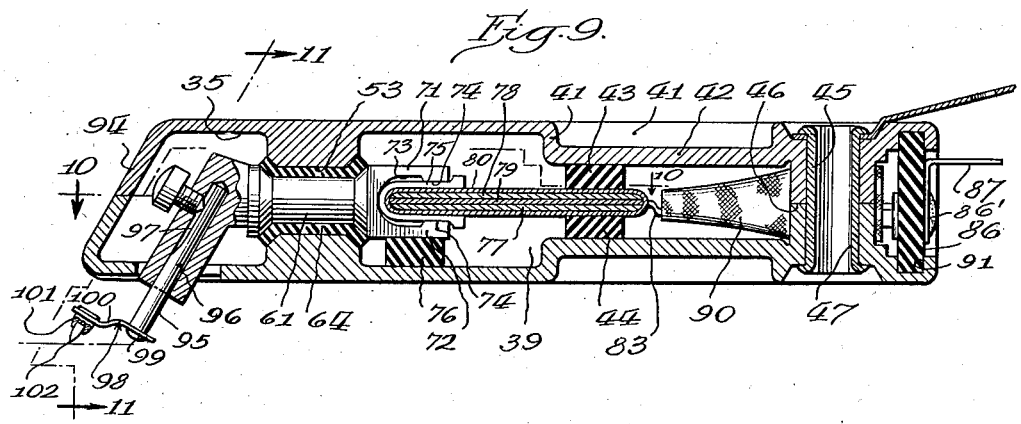
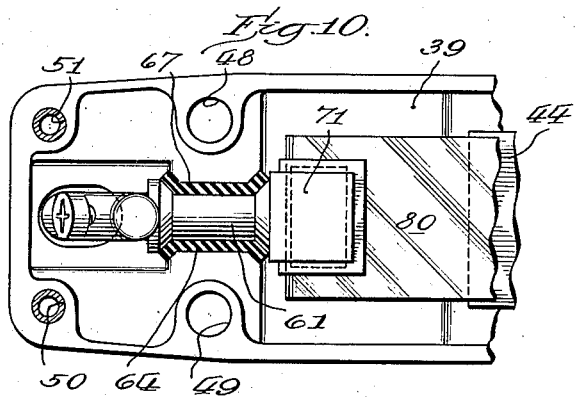
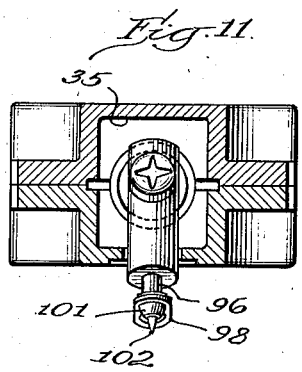
Inventor:
Roy Dally Patented May 9, 1944

2,348,526

UNITED STATES PATENT OFFICE 2,348,526

CRYSTAL PICKUP UNIT

Roy Dally, Racine, Wis., assignor to Webster Electric Company, Racine, Wis., a corporation of Delaware Application April 10, 1941, Serial No. 387,826

7 Claims. (Cl. 179—100.41)

The present invention relates to crystal reproducer units and is particularly concerned with crystal units adapted to be used at a relatively low needle pressure.

One of the objects of the invention is the provision of an improved crystal unit in which the chuck is so mounted that it is adapted to revolve in a circle or with a substantially universal movement within a limited range.

Another object of the invention is the provision of an improved crystal unit for reproducers which is adapted to be used at a relatively low needle pressure such as 1 ounce or less as compared with 2, 3, 4 or 5 ounces pressure on the needle, which has been customary with the devices of the prior art.

Another object of the invention is the provision of an improved crystal unit for reproducers which has a greater amount of vertical and lateral compliance than the devices of the prior art whereby the stylus carried by the unit is adapted to track more freely at any of a number of different angles, and it is not necessary to use an angular mounting on the tone arm to approximate tangential tracking.

Another object of the invention is the provision of an improved crystal pick-up assembly which is adapted to reproduce with high fidelity and adapted to be used for a long period of time without necessity for repair or readjustment.

Another object of the invention is the provision of an improved crystal pick-up unit which may be manufactured very economically and which may thus be placed within the means of a larger number of purchasers.

The present application relates to an improvement over the crystal pick-up unit and other structure disclosed and covered by my prior Patent No. 2,261,616, Crystal pickup unit, issued November 4, 1941.

Other objects and advantages of the invention will be apparent from the following description and accompanying drawings in which similar characters of reference indicate similar parts throughout the several views.

Referring to the three sheets of drawings accompanying this specification:

Figure 4 is a left end elevational view of the crystal unit of Figure 3;

Figure 5 is a right end or rear elevational view of the crystal unit of Figure 3;

Figure 6 is a vertical sectional view taken on the plane of line 6—6 of Figure 2 looking in the direction of the arrows;

Figure 7 is a vertical sectional view taken on the plane of line 7—7 of Figure 2 looking in the direction of the arrows;

Figure 8 is a bottom plan view of the crystal unit of Figure 2;

Figure 9 is a vertical sectional view taken on a plane passing through the axis of the chuck bearing with the chuck trunnion in elevation;

Figure 10 is a fragmentary horizontal sectional view taken on the plane of the line 10—10 of Figure 9; and Figure 11 is a sectional view taken on the plane of the line 11—11 of Figure 9 looking in the direction of the arrows.

Figure 1:
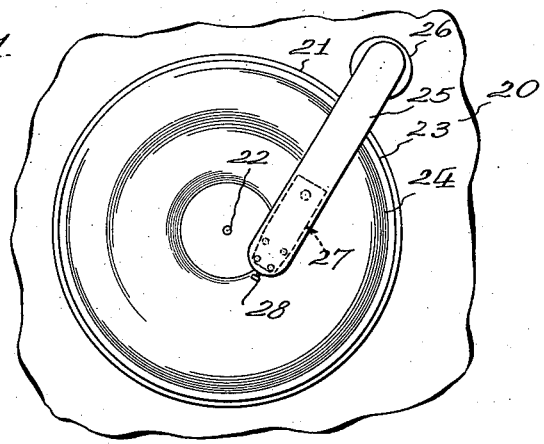
Figure 1 is a top plan view of a reproducer installation constructed according to the present invention.

Referring to Figure 1, 20 indicates the support or table of a phonograph which is provided with the usual turntable 21, rotatably mounted on shaft 22 and carrying the record 23 having groove 24.

The tone arm 25 is pivotally mounted on the supporting post 26 carried by the support 20 and its upper end in Figure 1 is mounted for pivotal movement about a horizontal axis, so that it may progress across the record as well as pivotal movement about a horizontal axis, so that it may be lifted from the record. The tone arm 25 may comprise a channeled member closed at each end and open at the bottom and constructed of metal or a phenolic condensation compound.

At its free end it houses and supports a crystal unit 27 and where the crystal unit has a removable stylus the clamping screw 28 may project through an aperture in one end of the tone arm 25.

Figure 2:
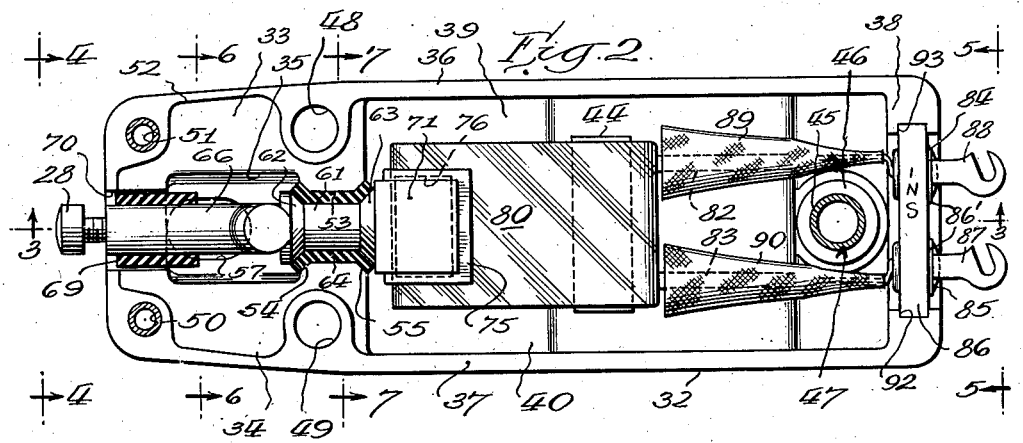
Figure 2 is a plan view of a reproducer unit with the top cover removed showing the internal construction of its parts.
Figure 3:
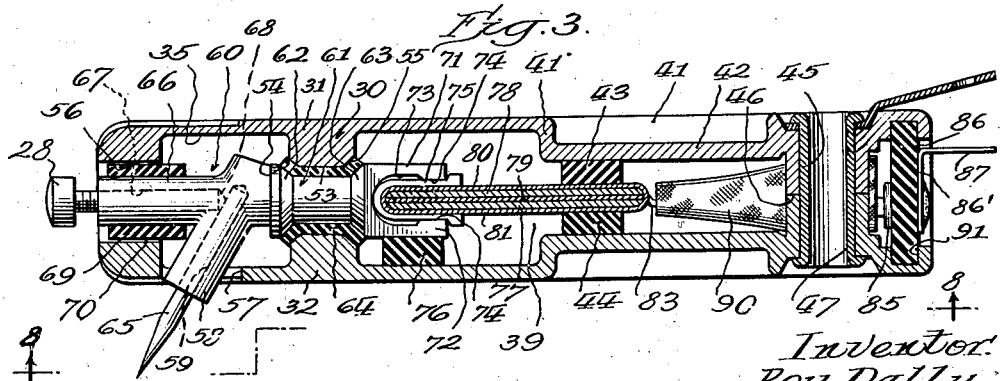
Figure 3 is a vertical sectional view taken on the plane of line 3—3 of Figure 2 looking in the direction of the arrows.

Referring to Figures 2 and 3, the crystal unit is here shown in detail. It comprises a housing, indicated generally at 30, and comprising a pair of half housing members 31—32, which may be similar in construction but which are oppositely disposed to form the housing 30. The half housing members may be made of metal in the form of a casting or they may be molded out of a phenolic condensation compound. In other embodiments of the invention, the housing halves may be stamped out of sheet metal. Each housing member has at its left end a relatively flat flange portion 33—34 on each side of a rectangular cup-shaped depression 35.

The housing members are each provided with a border flange 36—37 at each side and a relatively thicker end flange 38 closing a part of the end of a crystal chamber indicated at 39. Inside the crystal chamber, the bottom or top wall 40 as the case may be, is formed with an inwardly projecting flange 41 surrounding a flat bottom portion 42 which serves as a surface for engaging certain resilient blocks 43—44 that hold the crystal unit in the housing.

The housing member 31 or 32 is also provided with a bolt aperture at 45 surrounded by a tubular member 46 for receiving the rivet or bolt 47 that secures the two halves of the housing together at this end. At the other end the bolt or rivet apertures 48, 49, 50, 51 are provided in the flanges 33—34. The apertures 48, 49 are utilized for the rivet 47. The apertures 50—51 and 45 are utilized for receiving tubular rivets which are riveted over each end, securing the two half housings together. Apertures 48—49 and the aperture in the tubular rivet 47 may be used for bolts which secure the crystal reproducer unit in the tone arm.

All of the surfaces of the flanges 33—34—36—37 and 38 may be substantially flat or at least they may be provided with a border portion which is flat, as indicated by the line 52, so that when the two half housings are placed together, these plane surfaces engage each other and close the chambers 35—39. The chamber 35 communicates with chamber 39 when the housing members are together through a cylindrical bore 53, each end of which communicates with a frusto-conical portion 54 or 55.

In order to secure this result each half housing member is formed with a half cylindrical groove corresponding to 53 and with extensions of this groove which have frusto-conical surfaces 54 and 55. Where the chuck of the unit has a removable stylus, the housing is provided with a pair of half cylindrical grooves at its left end, forming a cylindrical bore 56 when the housing is assembled for passing that portion of the chuck which holds the clamping screw 28.

The lower half of the housing differs from the upper one in having an aperture at 57 in the bottom of the chuck chamber 35 for passing the chuck body 58 which has a needle socket 59. The chuck 60 may comprise a cast metal member having a horizontal cylindrical portion 61, serving as a trunnion and having frusto-conical surfaces 62 and 63 at each end of the cylindrical portion 61. A resilient sleeve of soft resilient rubber or other suitable resilient material such as printers roll compound, fits tightly on the portions 61—63 of the trunnion, and shapes itself so that it also has an external cylindrical surface and frusto-conical surfaces at each end. This rubber sleeve is compressed when the two housing members are secured together, so that the trunnion 61 is resiliently supported by means of the rubber sleeve 64 in the housing.

The frusto-conical portions 54—55 on the housing engage complementary frusto-conical portions of the rubber sleeve supported by the frusto-conical surfaces 61—62 serving as thrust bearings to prevent longitudinal movement of the chuck in the housing. These thrust bearings absorb shocks which might be applied to the needle or other parts of the chuck and prevent the longitudinal movement of the chuck from breaking the crystal.

The chuck 60 is provided with the obliquely extending body 58 having the bore 59 for receiving the stylus or needle 65. The oblong aperture 57 is of sufficient size to clear the cylindrical portion 58 of the chuck during the ordinary use of the crystal unit, so that there is no metal-to-metal contact when the crystal unit is being used. In other words, the amplitude of the movement of the chuck is less than the clearance between the aperture 57 and the portion 58, but the walls of the aperture 57 prevent excessive movement of the chuck in a rotative direction which might otherwise tend to break the crystals.

The chuck 60 is also provided with an outwardly extending cylindrical portion 66 having the threaded cylindrical bore 67 for receiving the clamping screw 28. The clamping screw 28 has a hardened pointed end 68 for engaging the stylus 65 to make a dent in the stylus and hold it more firmly. In order to make sure that there may be no metal-to-metal contact between the screw supporting portion 66 and the walls of the aperture 56 in the housing, this portion 66 is also surrounded by a rubber sleeve 69 which, however, may have a clearance 70 between it and the aperture 56. It is of the utmost importance that the chuck be mounted for free movement at this point and the portion 66 does not serve as a trunnion, as a greater freedom of movement is given by drilling out the aperture 56 to a larger size. By using the same rubber sleeve 69 in a loose condition, the chuck is given a maximum freedom of movement, but in some embodiments of the invention, a softer pure gum stock could be used contacting the walls of the aperture 56 also and the thickness of the rubber could be increased.

The chuck is, therefore, mounted for substantially universal movement on the trunnion 61 by means of the rubber sleeve 64. The trunnion 61 of the chuck 60 has a pair of clamping extensions comprising the horizontal flanges 71—72 formed with a clearance at 73 and with flat clamping surfaces at 74. A strip of resilient soft rubber 75 is folded into a U-shape about the end of the crystal assembly and the clamping members 71—72 are bent into tight engagement with the rubber strip 75 clamping the crystals as indicated in Figure 3. The amount of compression may be seen from the projection of the rubber strip 75 outside of the clamping members. A block 76 of soft resilient rubber or printers' roll composition is compressed between one of the clamping flanges 72 and the bottom wall of the housing member 32 to further dampen the movement of the chuck and control its resilient characteristics.

The crystals 77—78 comprise flat plates of piezo-electric crystals such as Rochelle salts, which are cut on such an axis that an electromotive force is generated due to the twisting of the crystals. These crystals are separated by a layer of tin foil 79 and are covered on the outside with a layer of tin foil 80—81, which are insulated from the portion 79 by the crystals.

Suitable connections in the form of projecting strips 82—83 are connected to the layers 80—81 and layer 79, respectively, and are soldered to the tubular rivets 84—85, carried by the insulating block 86. The tubular rivets 84—85 also pass through the supporting flanges 86' of a pair of connectors 87—88. The leads 82—83 may be insulated by tubular members 89—90 of paraffin coated paper or other insulated members of tubular shape when the housings are made of metal.

The insulating block 86 is mounted in grooves 91 in the bottom of each half housing and grooves 92—93 in the end flange 38 of each housing member.

When the two housing members are clamped together, the insulating block 86 is secured against removal by the flanges which form the walls of these grooves. The right hand end of the crystal assembly is clamped between the two blocks 43—44, previously described, which are engaged by the flat portions 42 of the housing and compressed when the housing halves are secured together. Thus the right hand end of the crystal assembly is held against twisting by the blocks 43—44, but the left hand end is adapted to be twisted and otherwise distorted by the rotative movements of the chuck under the influence of the stylus 65.

Referring to Figure 9, this shows a modification in which the right hand end of the crystal unit is of similar construction but the bearing surface 53 and the rubber sleeve 64 and the trunnion cylindrical surface 61 have all been made longer. In this embodiment the stylus is intended to be left in the chuck by the user and only removed at the factory. Consequently, the chuck chamber 35 is closed by a diagonally extending wall 94. This illustrates more clearly the fact that only one bearing is actually needed and the chuck has a substantially universal movement in this bearing as distinguished from the rotative movement of the devices of the prior art.

The stylus 95 employed in this modification is of a particular construction which may also be used in the device of Figure 2. This stylus has a cylindrical shank 96 provided with a flattened surface at 97 and its lower end is reduced and made non-circular to fit in a complementary aperture in a flat spring strip 98 to which the lower end is riveted at 99. The flat spring strip 98 has an offset at 100 and at its opposite end it has a small metal rod 101 riveted to it and passing through an aperture in the strip 100. This rod 100 has a drilled bore for receiving the upper end of a stone such as a sapphire or a diamond, or a tungsten member may be used, and the rod 100 has its lower end spun over into engagement with the pointed member 102.

The stylus 95 is the subject of my copending application, Serial No. 399,257, filed June 23, 1941, and its advantage is that it has a maximum amount of vertical and lateral compliance which permits the use of a very low tracking pressure. This advantage is also realized by the pick-up of the present invention due to the substantially universal movement of the chuck in its single bearing.

By using the novel stylus of my copending application in this pick-up unit, a still greater amount of freedom of the stylus may be obtained and a corresponding lower needle pressure may be used. It will thus be observed that I have invented an improved crystal unit in which the chuck is permitted to have a substantially universal movement.

The point of the chuck is able to revolve in a circle, so that it may adapt its position to the groove at all times and may rise in the groove on occasion to permit freer tracking. As distinguished from the needle pressures of 2, 3, 4 and 5 ounces which are required for the device of the prior art, the present crystal unit may be used with a needle pressure of 1 ounce or less which reduces the mechanical noise and provides for more faithful reproduction. There is less wear on the stylus and on the records.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a crystal unit for reproducers, the combination of a pair of half housing members, each half housing member being formed with a depression forming half of a chuck chamber and a depression forming half of a crystal chamber, each half housing also having a groove joining said chamber recesses, said groove being bordered at each end by a thrust surface, means carried by the housing for clamping resiliently one end of a crystal assembly and a chuck for clamping the other end of said crystal assembly, said chuck having a single trunnion and said trunnion being covered by a rubber sleeve, said trunnion having thrust enlargements at each end, said chuck being adapted to carry a stylus and said rubber sleeve being placed under predetermined pressure by said clamping housing members whereby the stylus carried by said chuck may have a revolving movement in a vertical plane at its point, said chuck having its stylus supporting portion projecting through an aperture in the lower wall of said housing having a predetermined clearance with the stylus supporting portion of the chuck to prevent contact between these parts during reproduction, the sides of said aperture serving as stops to prevent excessive rotative movement of the chuck which might break a crystal.

2. In a crystal unit for reproducers, the combination of a pair of half housing members, each half housing member being formed with a depression forming half of a chuck chamber and a depression forming half of a crystal chamber, each half housing also having a groove joining said chamber recesses, said groove being bordered at each end by a thrust surface, means carried by the housing for clamping resiliently one end of a crystal assembly and a chuck for clamping the other end of said crystal assembly, said chuck having a single trunnion and said trunnion being covered by a rubber sleeve, said trunnion having thrust enlargements at each end, said chuck being adapted to carry a stylus and said rubber sleeve being placed under predetermined pressure by said clamping housing members whereby the stylus carried by said chuck may have a revolving movement in a vertical plane at its point, said chuck having a forwardly extending portion for supporting a clamping screw and said latter portion being provided with a rubber bushing sleeve, said bushing sleeve having a clearance with respect to the housing whereby a maximum freedom of the chuck is provided and a minimum needle pressure may be used.

3. In a crystal unit for reproducers, the combination of a pair of half housing members, each half housing member being formed with a recess forming half of a chuck chamber and a recess forming half of a crystal chamber, said recesses being joined by a groove whereby the half housing members when assembled provide a pair of chambers separated by a restricted aperture, means carried by the housing members for resiliently clamping one end of a crystal assembly and a chuck having clamping engagement with the other end of said crystal assembly, said chuck having a single trunnion extending through said restricted aperture, and said trunnion being covered by a resilient compressible covering adapted to be compressed in said restricted aperture, said trunnion having a transversely extending socket for a stylus and having a threaded member adapted to engage the shank of a stylus in said chuck, and said resilient covering being placed under predetermined pressure by said clamping housing members whereby the stylus carried by said chuck may have a revolving movement in a vertical plane at its point.

4. In a crystal unit for reproducers, the combination of a pair of half housing members, each half housing member being provided with an inwardly extending portion having a groove for receiving a chuck trunnion, a crystal assembly in said half housing members and clamped at one end by resilient means engaged by the half housing members and located on one side of said groove, a chuck located in said half housing members on the other side of said groove, and having a trunnion extending through said groove, clamping means carried by the chuck for engaging the crystal assembly whereby the crystal assembly may be subjected to torsional strains by movement of the chuck, said chuck having a transversely extending socket, and a longitudinally extending threaded bore communicating with said socket, a resilient cushion between said trunnion and the walls of said groove, a threaded member in said threaded bore for engaging the shank of a stylus, said resilient cushion being placed under predetermined pressure by said clamping housing members whereby a stylus carried by said chuck may have a revolving movement in a vertical plane at its point, and said grooves forming a restricted aperture for resisting thrust placed upon said threaded member and preventing injury to said crystal assembly.

5. In a crystal unit for reproducers, the combination of a pair of half housing members, each half housing member being provided with an inwardly extending portion having a groove for receiving a chuck trunnion, a crystal assembly in said half housing members and clamped at one end by resilient means engaged by the half housing members and located on one side of said groove, a chuck located in said half housing members on the other side of said groove, and having a trunnion extending through said groove, clamping means carried by the chuck for engaging the crystal assembly whereby the crystal assembly may be subjected to torsional strains by movement of the chuck, said chuck having a transversely extending socket, and a longitudinally extending threaded bore communicating with said socket, a resilient cushion between said trunnion and the walls of said groove, a threaded member in said threaded bore for engaging the shank of a stylus, said resilient cushion being placed under predetermined pressure by said clamping housing members whereby a stylus carried by said chuck may have a revolving movement in a vertical plane at its point, and said grooves forming a restricted aperture for resisting thrust placed upon said threaded member and preventing injury to said crystal assembly, said trunnion having a thrust surface at its outer end, and said cushion extending outwardly of the aperture formed by said grooves to resist movement of said thrust surface inwardly of said unit.

6. In a crystal unit for reproducers, the combination of a pair of half housing members, each half housing member being provided with an inwardly extending portion having a groove for receiving a chuck trunnion, a crystal assembly in said half housing members and clamped at one end by resilient means engaged by the half housing members and located on one side of said groove, a chuck located in said half housing members on the other side of said groove, and having a trunnion extending through said groove, clamping means carried by the chuck for engaging the crystal assembly whereby the crystal assembly may be subjected to torsional strains by movement of the chuck, said chuck having a transversely extending socket, and a longitudinally extending threaded bore communicating with said socket, a resilient cushion between said trunnion and the walls of said groove, a threaded member in said threaded bore for engaging the shank of a stylus, said resilient cushion being placed under predetermined pressure by said clamping housing members whereby a stylus carried by said chuck may have a revolving movement in a vertical plane at its point, and said grooves forming a restricted aperture for resisting thrust placed upon said threaded member and preventing injury to said crystal assembly, and resilient means interposed between the crystal assembly and the clamping member on said chuck for determining the resilient characteristics of said crystal unit.

7. In a crystal pick-up unit, the combination of a support having means for clamping one end of the crystal with a chuck, said chuck having a grooved trunnion portion provided with a resilient covering, said chuck having means for supporting a stylus and having its end opposite to the stylus secured to the crystal, said grooved trunnion portion being located between the stylus and the crystal, and said support having means for engaging said resilient covering whereby the chuck is supported for universal movement as well as torsional movement and the pickup unit may be used at minimum needle pressures.

ROY DALLY.